(12) United States Patent
Kobayashi

(10) Patent No.: US 7,756,331 B2
(45) Date of Patent: Jul. 13, 2010

(54) IMAGE PROCESSING APPARATUS AND METHOD FOR DISPLAYING IMAGES AND CORRESPONDING HISTOGRAMS

(75) Inventor: Yoshihiro Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1082 days.

(21) Appl. No.: 11/176,395

(22) Filed: Jul. 8, 2005

(65) Prior Publication Data

US 2006/0008159 A1    Jan. 12, 2006

(30) Foreign Application Priority Data

Jul. 12, 2004 (JP) ............... 2004-205065
Jul. 12, 2004 (JP) ............... 2004-205066

(51) Int. Cl.
*G06K 9/00* (2006.01)
*G06K 9/36* (2006.01)
*G06K 9/46* (2006.01)

(52) U.S. Cl. ............. 382/168; 382/232; 382/233

(58) Field of Classification Search ........... 382/168, 382/232, 233; 708/203
See application file for complete search history.

(56) References Cited

U.S. PATENT DOCUMENTS

| | | | |
|---|---|---|---|
| 6,373,533 B1 * | 4/2002 | Kawabata et al. ........... 348/672 |
| 6,691,102 B2 * | 2/2004 | Chang et al. ................. 707/2 |
| 2003/0016299 A1 * | 1/2003 | Matsushima ........... 348/333.02 |
| 2003/0156196 A1 * | 8/2003 | Kato et al. ............... 348/207.2 |
| 2003/0202692 A1 * | 10/2003 | Obrador ..................... 382/170 |
| 2003/0228064 A1 * | 12/2003 | Gindele et al. ............. 382/260 |

FOREIGN PATENT DOCUMENTS

| | | |
|---|---|---|
| JP | 8046788 A | 2/1996 |
| JP | 2002-010073 A | 1/2002 |
| JP | 2003-125240 | 4/2003 |
| JP | 2003-244487 A | 8/2003 |

\* cited by examiner

*Primary Examiner*—Yubin Hung
(74) *Attorney, Agent, or Firm*—Fitzpatrick, Cella, Harper & Scinto

(57) ABSTRACT

When image data which is decoded after being irreversibly compressed is to be displayed, this invention makes it possible to display a histogram close to the exposure conditions perceived by the human sense during photography. This invention includes a histogram acquisition unit which acquires histogram information from input image data, an encoding unit which generates encoded image data by encoding the input image data or by encoding image data obtained by performing predetermined processing on the input image data, and a recording unit which records the encoded image data and histogram information.

20 Claims, 13 Drawing Sheets

FIG. 5

FILE INFORMATION

RECORDING MODE

APERTURE VALUE

SHUTTER SPEED

ISO SENSITIVITY

RECORDING SIZE

SENSOR SIZE

RECORDING DATE/TIME etc

| HISTOGRAM MARKER |
| --- |
| HISTOGRAM INFORMATION |

| THUMBNAIL IMAGE |
| --- |
| DISPLAY IMAGE |
| MAIN IMAGE (RECORDING IMAGE) |

IMAGE PROCESSING APPARATUS AND METHOD FOR DISPLAYING IMAGES AND CORRESPONDING HISTOGRAMS

FIELD OF THE INVENTION

The present invention relates to the image processing techniques of still images and moving images.

BACKGROUND OF THE INVENTION

In a conventional image processing apparatus such as an electronic still camera, an image signal photographed and output by an image sensor is converted into digital data by an A/D converter, and undergoes necessary image processing in many cases. After that, the image signal undergoes irreversible compression conversion such as JPEG encoding, and is recorded on a recording medium.

The irreversibly compressed image data is read out from the recording medium inside the electronic still camera, decoded (reconstructed), and displayed on a display unit or the like. In this case, it is also possible to obtain histogram information indicating the frequency distribution of the luminance from the decoded playback image data, and display this histogram information together with the decoded image data on the display unit such as a liquid crystal monitor. This allows the user to determine whether the exposure level of the photographed image data is correct, or whether the photographing conditions are appropriate.

A technique which displays a bar chart or line graph representing the frequency for each luminance level on a liquid crystal monitor or the like in order to allow easy check of the correctness of the exposure level during photography is already well-known.

When irreversible compression such as JPEG encoding is performed, however, the original characteristic, e.g., the accurate luminance information of image data is lost. Accordingly, histogram information obtained from decoded image data sometimes largely differs from the histogram information of image data before irreversible compression. Especially when irreversible compression is performed at a high compression ratio, a luminance value degenerates for each quantization step during the course of quantization in the irreversible compression. Consequently, as shown in FIG. 6B, the histogram information becomes discrete.

Also, as the number of pixels of the image sensor increases, the decoding time of image data recorded at the maximum resolution prolongs. This lowers the response when the histogram is displayed together with the playback image. To prevent this lowering of the response, therefore, a thumbnail image is displayed by resizing where necessary, or a prerecorded image having resolution lower than the maximum resolution is displayed. However, when the resolution is decreased, the original characteristic, e.g., the accurate luminance information of the image data is lost. Consequently, as shown in FIG. 6C, the obtained histogram information sometimes differs from the histogram information, FIG. 6A, of image data before resolution conversion.

As described above, when histogram information obtained from image data decoded inside an electronic still camera or the like is displayed together with the image data, the displayed histogram information may be different from the actual human sense, and may also be different from the exposure conditions during photography.

FIGS. 6A to 6C explain this problem. FIG. 6A shows a histogram obtained from original image data before resolution conversion. FIG. 6B shows a histogram after irreversible compression is performed at a high compression ratio. FIG. 6C shows a histogram after conversion into a low resolution and irreversible compression are performed. As shown in FIGS. 6A to 6C, the histogram after irreversible compression is performed at a high compression ratio largely differs from the distribution curve of the histogram indicating the exposure conditions during photography.

SUMMARY OF THE INVENTION

The present invention, therefore, has been made in consideration of the above problems, and makes it possible to display a histogram close to the human sense and close to the exposure conditions during photography, when image data which is decoded after irreversibly compressed is displayed.

To solve the above problems, according to a first aspect of the present invention, an image processing apparatus is characterized by comprising a histogram acquisition unit which acquires histogram information from input image data, a resizing unit which generates resized image data by resizing the input image data to a predetermined resolution, an encoding unit which generates encoded image data by encoding the resized image data, and a recording unit which records the resized image data and histogram information.

According to a second aspect of the present invention, an image processing method is characterized by comprising a histogram acquisition step of acquiring histogram information from input image data, a resizing step of generating resized image data by resizing the input image data to a predetermined resolution, an encoding step of generating encoded image data by encoding the resized image data, and a recording step of recording the encoded image data and histogram information.

According to a third aspect of the present invention, a program is characterized by causing a computer to execute the image processing method described above.

According to a fourth aspect, a storage medium is characterized by storing the program described above in a computer-readable form.

According to a fifth aspect of the present invention, an image capturing apparatus is characterized by comprising an image sensor, a histogram acquisition unit which acquires histogram information from image data obtained by converting an output signal from the image sensor into a digital signal, a resizing unit which generates resized image data by resizing, to a predetermined resolution, the image data obtained by converting the output signal from the image sensor into a digital signal, an encoding unit which encodes the resized image data, and a recording unit which records the resized image data and histogram information.

According to a sixth aspect of the present invention, an image processing apparatus is characterized by comprising a decoding unit which decodes image data from a data stream obtained by irreversibly compressing image data, a histogram acquisition unit which acquires histogram information of the image data decoded by the decoding unit, a histogram correction unit which corrects the histogram information acquired by the histogram acquisition unit, and a display unit which displays predetermined image data decoded by the decoding unit, wherein the display unit displays the predetermined image data, and the histogram information corrected by the histogram correction unit.

According to a seventh aspect, an image processing apparatus is characterized by comprising a decoding unit which decodes image data from a data stream obtained by irreversibly compressing image data, a histogram acquisition unit which acquires histogram information of the image data decoded by the decoding unit, a histogram correction unit which corrects the histogram information acquired by the histogram acquisition unit, a resizing unit which generates a plurality of resized image data by resizing the image data decoded by the decoding unit to a plurality of predetermined resolutions, and a display unit which displays predetermined resized image data selected from the plurality of resized image data generated by the resizing unit, wherein the display unit simultaneously displays the histogram information corrected by the histogram correction unit, regardless of which of the plurality of resized image data is displayed.

According to an eighth aspect of the present invention, an image processing method is characterized by comprising a decoding step of decoding image data from a data stream obtained by irreversibly compressing image data, a histogram acquisition step of acquiring histogram information of the image data decoded in the decoding step, a histogram correction step of correcting the histogram information acquired in the histogram acquisition step, and a display step of displaying predetermined image data decoded in the decoding step, wherein the display step displays the predetermined image data, and the histogram information corrected in the histogram correction step.

According to a ninth aspect of the present invention, an image processing method is characterized by comprising a decoding step of decoding image data from a data stream obtained by irreversibly compressing image data, a histogram acquisition step of acquiring histogram information of the image data decoded in the decoding step, a histogram correction step of correcting the histogram information acquired in the histogram acquisition step, a resizing step of generating a plurality of resized image data by resizing the image data decoded in the decoding step to a plurality of predetermined resolutions, and a display step of displaying the histogram information corrected in the histogram correction step together with predetermined resized image data selected from the plurality of resized image data resized in the resizing step, wherein regardless of which of the plurality of resized image data is displayed in the display step, histogram information displayed together with the resized image data is obtained by correcting, in the histogram correction step, the histogram information acquired from the same image data in the histogram acquisition step.

According to a 10th aspect of the present invention, a program is characterized by causing a computer to execute the image processing method described above.

According to a 11th aspect of the present invention, a storage medium is characterized by storing the program described above in a computer-readable form.

According to a 12th aspect of the present invention, an image processing apparatus is characterized by comprising a resizing unit which generates resized image data by resizing input image data to a predetermined resolution, an encoding unit which generates encoded image data by encoding the resized image data, a first histogram acquisition unit which acquires histogram information from the input image data, a recording unit which records the resized image data and histogram information, a decoding unit which decodes the encoded image data encoded by the encoding unit, and a display unit which displays predetermined image data decoded by the decoding unit, wherein if histogram information obtained by the first histogram acquisition unit is not recorded in the recording unit, histogram information of image data decoded by the decoding unit is acquired, histogram information acquired by the histogram acquisition unit is corrected, and the display unit displays the predetermined image data, and the histogram information corrected by the histogram correction unit.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 is a view showing a file structure to which histogram information is given;

DETAILED DESCRIPTION OF THE PREFERRED EMBODIMENTS

Preferred embodiments of the present invention will now be described in detail in accordance with the accompanying drawings.

First Embodiment

Figure 1:
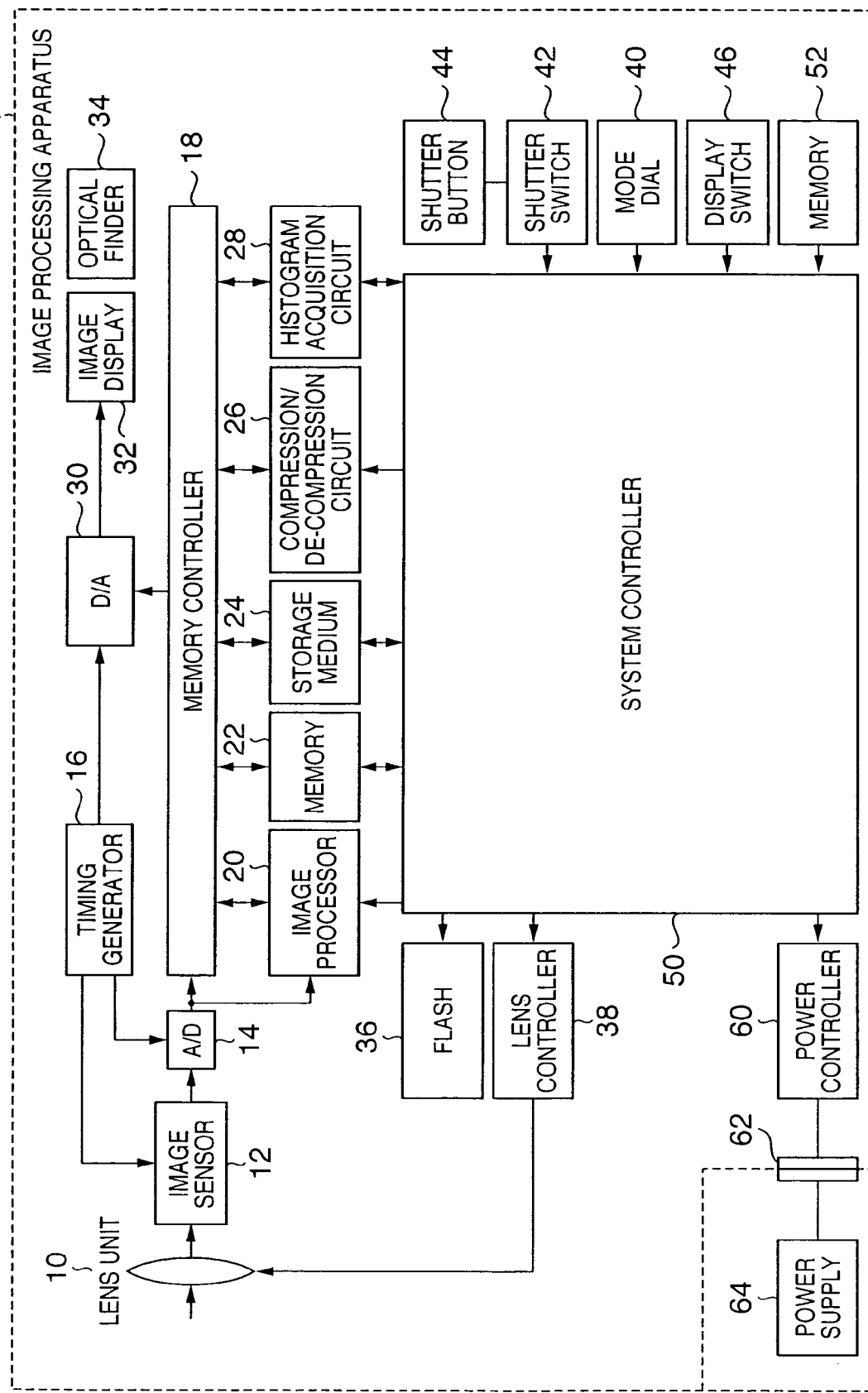
FIG. 1 is a view showing the arrangement of the first embodiment of an image processing apparatus of the present invention.

FIG. 1 is a view showing the arrangement of the first embodiment of an image processing apparatus of the present invention.

In FIG. 1, reference numeral 10 denotes a lens unit having a zooming mechanism, stop mechanism, and the like; 12, an image sensor (e.g., a CCD) which converts an optical image into an electrical signal; 14, an A/D converter which converts the analog output signal from the image sensor 12 into a digital signal; and 16, a timing generator which supplies clock signals or control signals to the image sensor 12, the A/D converter 14, and a D/A converter 30. The timing generator 16 is controlled by a system controller 50.

A memory controller 18 controls data transfer between the A/D converter 14, an image processor 20, a memory 22, a recording medium 24, a compression/de-compression circuit 26, the D/A converter 30, and a histogram acquisition circuit 28.

The output data from the A/D converter 14 is written in the memory 22 or recording medium 24 via the image processor 20 and memory controller 18, or via the memory controller 18 alone.

The image processor 20 performs image processing, such as image interpolation, color conversion, or resizing, on the output data from the A/D converter 14 or the output data from the memory controller 18.

The memory 22 is used as a work area when image processing or compression/de-compression is performed on a photographed still image or moving image, or is used for display images. The memory 22 is incorporated into an image processing apparatus 100, and has a recording capacity sufficient to store a predetermined number of still images or a predetermined time of moving images. The memory 22 can also be used as a work area of the system controller 50.

The recording medium 24 is, e.g., a memory card or hard disk for recording compressed image data. The recording medium 24 is made of, e.g., a semiconductor memory or magnetic disk, and contained in the image processing apparatus 100 or can be detached from it.

The compression/de-compression circuit 26 compresses image data by, e.g., JPEG irreversible compression, or de-compresses compressed data. That is, the compression/de-compression circuit 26 reads out image data stored in the recording medium 24, compresses or de-compresses the readout data, and writes the processed data in the memory 22.

The histogram acquisition circuit 28 reads out image data written in the memory 22, acquires the frequency distribution of the luminance or of a predetermined color of the image data, and writes it in the memory 22. Details of the histogram acquisition circuit 28 will be described later with reference to FIG. 2.

Reference numeral 30 denotes the D/A converter; and 32, an image display which is a TFT-LCD or the like. Display image data written in the memory 22 is supplied to the image display 32 via the D/A converter 30, and the image is displayed.

An electronic finder function can be realized by successively displaying images to be sensed by using the image display 32. The image display 32 can also display information necessary for photography. For example, the image display 32 can perform in-focus display, camera shake warning display, flash charging display, shutter speed display, aperture value display, and exposure compensation display.

In addition, the image display 32 can realize a playback function with information display, i.e., can display photographed images, and can also display image data together with the photographing information and luminance histogram information of the image data.

Reference numeral 34 denotes an optical finder. By using the optical finder 34, photography can be performed without using the electronic finder function using the image display 32. Also, an element for displaying various types of information for photography, warning, and the like via the display 32 is installed in the optical finder 34.

A flash 36 has an AF auxiliary light emitting function and flash light control function.

Reference numeral 38 denotes a controller of the lens unit 10. The controller 38 controls, e.g., focusing, zooming, the aperture value, and the shutter speed of the lens unit 10 in accordance with instructions from the system controller 50.

Reference numeral 40 denotes a photographing mode dial switch. By using the photographing mode dial switch 40, the operator can switch various function modes such as a power OFF mode, automatic photography mode, manual photography mode, panorama photography mode, playback mode, and moving image mode.

Reference numeral 42 denotes a shutter switch. In the middle (first stroke) of an operation of a shutter button 44, the shutter switch 42 turns on a switch signal SW1 to designate the start of operations, e.g., an AF (Auto Focusing) process, AE (Auto Exposure) process, AWB (Auto White Balance) process, and EF (flash preemission) process.

Also, when the operation of the shutter button 44 is complete (second stroke, i.e., a user's instruction), the shutter switch 42 turns on a switch signal SW2 to designate the start of a series of processes, i.e., an exposure process in which an output signal from the image sensor 12 is converted into a digital signal by the A/D converter 14, and stored in the memory 22 via the memory controller 18, a development process which is performed in the image processor 20 via the memory controller 18, a compression process which is performed in the compression/de-compression circuit 26 via the memory controller 18, and a recording process in which the compressed image data is written in the recording medium 24 from the memory 22 via the memory controller 18.

Reference numeral 46 denotes a display switch. When pressed during photography, the display switch 46 instructs the system controller 50 to control ON/OFF of the electronic finder function using the image display 32. When pressed during playback, the display switch 46 instructs the system controller 50 to control ON/OFF of the playback function with information display.

The system controller 50 controls an image processing apparatus 100. A memory 52 stores constants, variables, programs, and the like which the system controller 50 refers to when operating.

A power controller 60 comprises a battery detector, a DC-DC converter, and a switching circuit for switching blocks to be powered. The power controller 60 detects the presence/absence of a battery, the type of the battery, and the residual amount of the battery, and controls the DC-DC converter on the basis of the detection results and instructions from the system controller 50, thereby supplying a necessary voltage to each unit only for a necessary period. Reference numeral 62 denotes a connector; and 64, a power supply comprising, e.g., a primary battery such as an alkali battery or lithium battery, a secondary battery such as an Li battery, and an AC adaptor.

Figure 2:
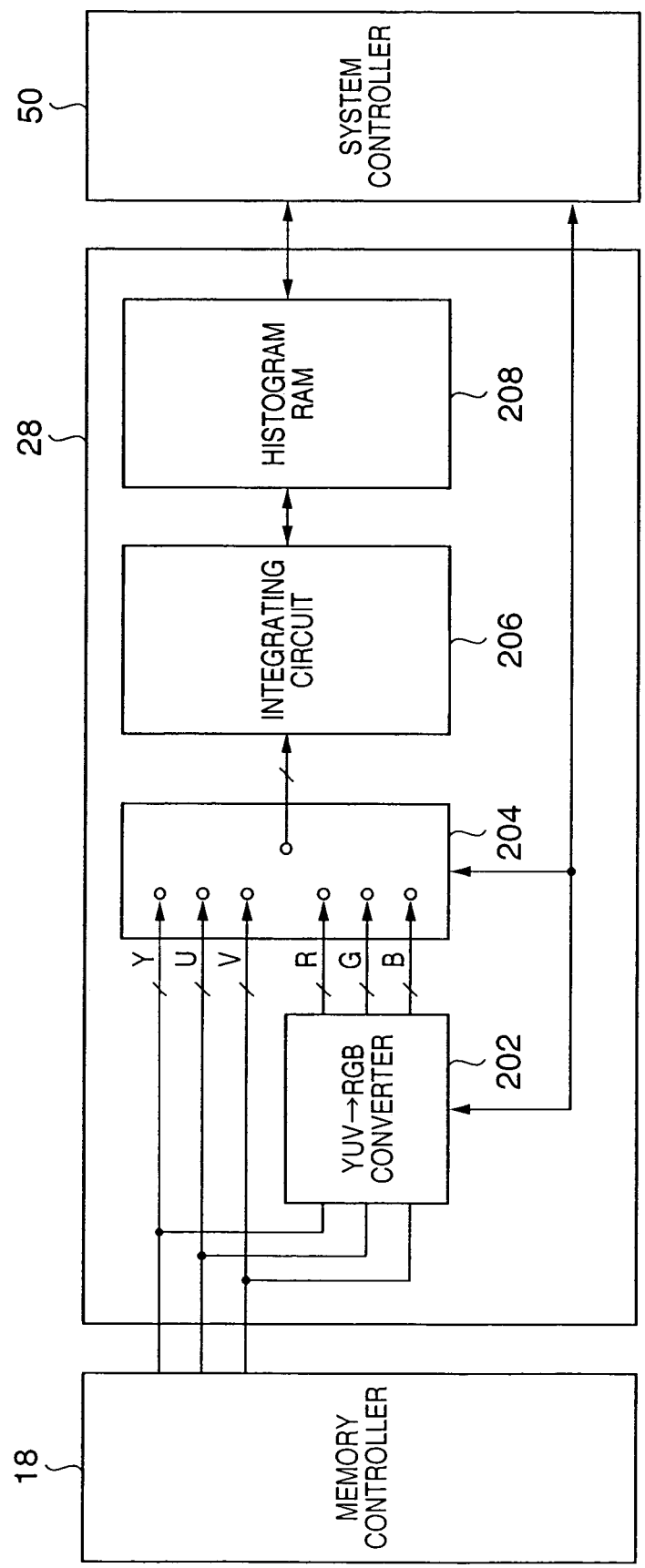
FIG. 2 is a block diagram of a histogram acquisition circuit in the first embodiment.

FIG. 2 is a view showing the arrangement of the histogram acquisition circuit 28 in this embodiment.

Reference numeral 202 denotes a YUV→RGB converter which converts YUV data input via the memory controller 18 into RGB data in accordance with a conversion formula designated by the system controller 50.

Reference numeral 204 denotes a selector which selects a frequency distribution color component to be acquired, in accordance with instructions from the system controller 50.

Reference numeral 206 denotes an integrating circuit which determines a read address of a histogram RAM in accordance with the output value from the selector 204, ad reads out data. The integrating circuit 206 increments the readout value, and writes it in the same address of the histogram RAM again.

A histogram RAM 208 holds the frequency distribution of input data. Data can be read out or cleared by instructions from the system controller 50.

An address space in the histogram RAM 208 is determined by the resolution of a histogram to be acquired. When a histogram having 256 gray levels is to be acquired, an address space of 256 words is necessary.

Assume that the capacity per word of the histogram RAM 208 is large enough for the size of input image data.

Figure 3:
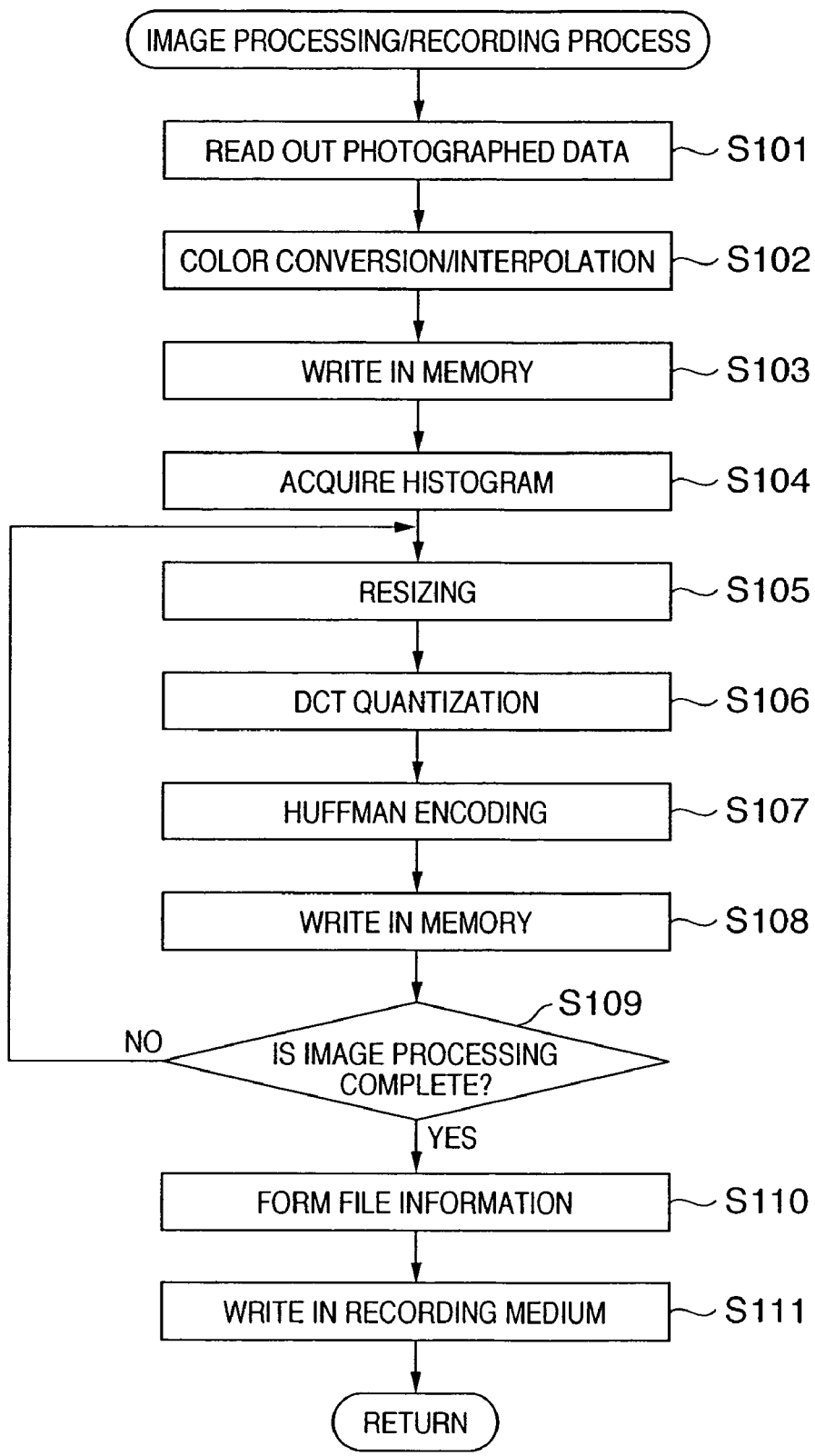
FIG. 3 is a flowchart of an image processing/recording process routine in the first embodiment.

FIG. 3 is a detailed flowchart of an image processing/recording process performed by the image processing apparatus 100.

First, digital photographing data obtained by the A/D converter 14 is once written in the memory 22 via the memory controller 18. After that, the system controller 50 reads out the photographing data from the memory 22 to the image processor 20 via the memory controller 18 (step S101), performs image processing such as color conversion/interpolation corresponding to the recording mode (step S102), and writes the processed data in the memory 22 via the memory controller 18 (step S103).

The recording modes include an RAW image recording mode and JPEG image recording mode. In the RAW image recording mode, in order to hold information in the state of image sensing as well as possible, an RAW image obtained by irreversibly compressing image sensing data which is obtained by A/D-converting an output signal from the image sensor, a JPEG main image obtained by developing this RAW image under the conditions of image sensing, and a display image and thumbnail image obtained by resizing the JPEG main image into respective predetermined resolutions are collectively recorded. In the JPEG image recording mode, a JPEG main image obtained by performing irreversible compression such as JPEG on image data which is obtained by developing image sensing data during image sensing, and a display image and thumbnail image obtained by resizing this JPEG main image into respective predetermined resolutions are collectively recorded.

The JPEG image recording mode further has a mode in which the individual resized images have different sizes (Large/Middle1/Middle2/Small), and a mode in which image qualities are different (e.g., ultrahigh image quality, high image quality, and normal). In image sensing, the user can select any one mode by using a switch (not shown). In this embodiment, data obtained by A/D-converting an output signal from the image sensor will be called image sensing data, and data which is color-separated into a luminance signal and RGB signal by developing the image sensing data, i.e., data from which histogram information is obtainable will be called image data.

A thumbnail image is low-resolution, small-sized image data which is used when a plurality of images stored in the recording medium are to be displayed in the form of a list.

A display image is image data which has a size and resolution larger and higher than those of the thumbnail image, and is prepared in a size slightly larger than that of the display unit so as to be, e.g., displayed in an enlarged scale.

The system controller 50 acquires, via the histogram acquisition circuit 28, the frequency distribution of the luminance or of a desired color component from the image data written in the memory 22 (step S104).

The system controller 50 reads out the image data written in the memory 22 to the image processor 20 via the memory controller 18, and performs image processing such as resizing in accordance with the recording mode described above, or in accordance with the purpose, e.g., the formation of a display image or thumbnail image (step S105).

The system controller 50 supplies the image data having undergone the desired image processing to the compression/de-compression circuit 26 via the memory controller 18. The compression/de-compression circuit 26 performs discrete cosine transform (DCT) and quantization (step S106), performs Huffman encoding as one entropy encoding (step S107), and writes the compressed image data in the memory 22 (step S108). Another example of the entropy encoding is arithmetic encoding.

If the system controller 50 determines that all the image processing and compression process for, e.g., the recording image data, display image data, and thumbnail image data corresponding to the recording mode are complete (step S109), it forms, as the header of an image file, file information pertaining to photographing data such as the recording mode, aperture value, shutter speed, ISO sensitivity, recording size, sensor size, and recording date/time (step S110). The system controller 50 then writes, in the recording medium 24, the histogram information acquired in step S104 together with one or a plurality of compressed image data written in the memory 22 in step S108 (step S111).

The histogram information is recorded in file information as shown in FIG. 5. Assume that the histogram information is recorded as follows following a predetermined histogram marker indicative of the storage location of the histogram information.

Storage address: storage value
0xFF**: (histogram marker)
0xAAaa: aa=the frequency of luminance level 0
   AA=the frequency of luminance level 1
0xBBbb: bb=the frequency of luminance level 2
   BB=the frequency of luminance level 3
0xCCcc: cc=the frequency of luminance level 4
   CC=the frequency of luminance level 5
   :
   :
0xZZzz: zz=the frequency of luminance level 254
   ZZ=the frequency of luminance level 255

When data write to the recording medium is complete, the recording process routine is terminated.

Figure 4:
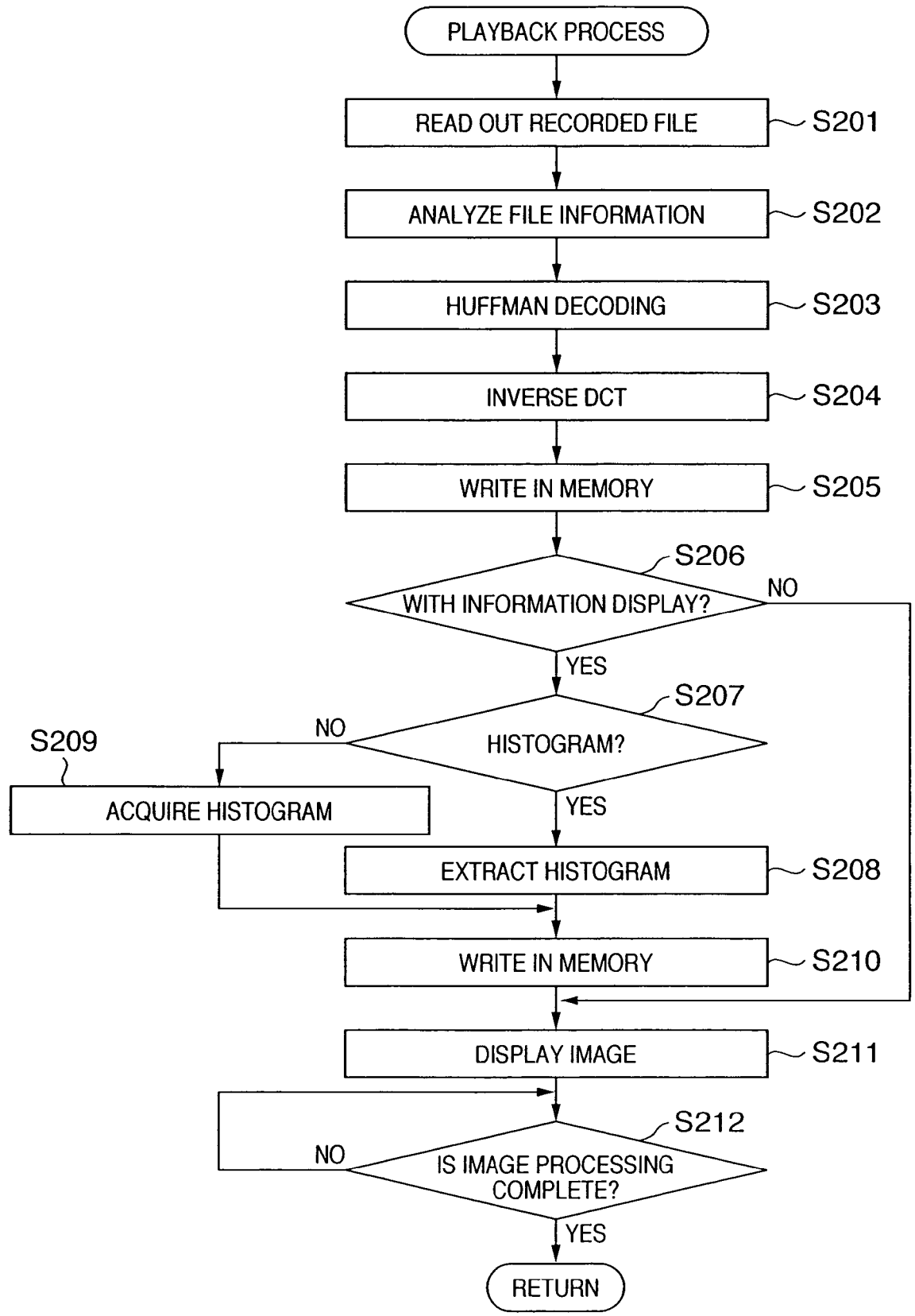
FIG. 4 is a flowchart of a playback process routine in the first embodiment.
Figure 6A:
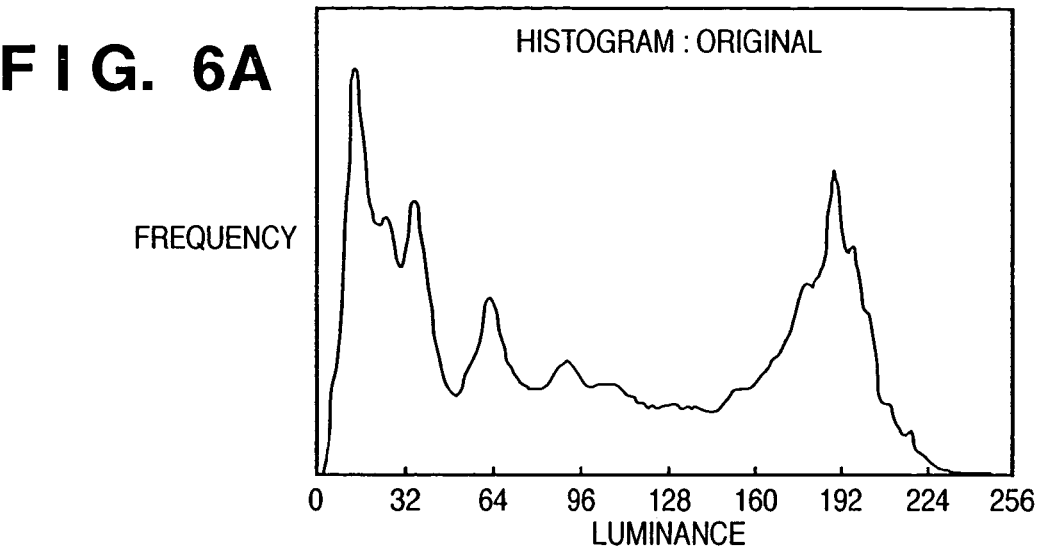
FIGS. 6A to 6C are graphs for explaining histograms.
Figure 6B:
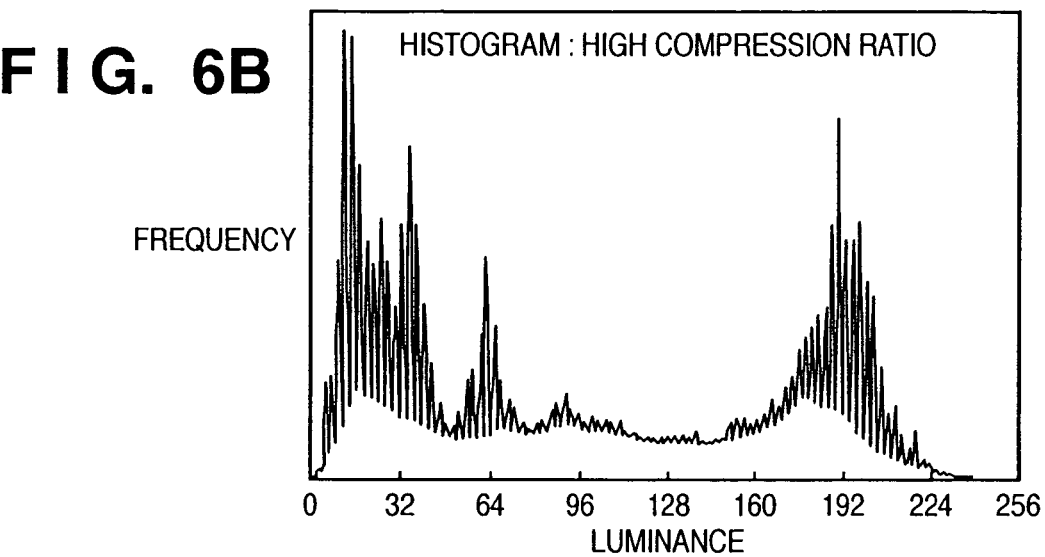
Figure 6C:
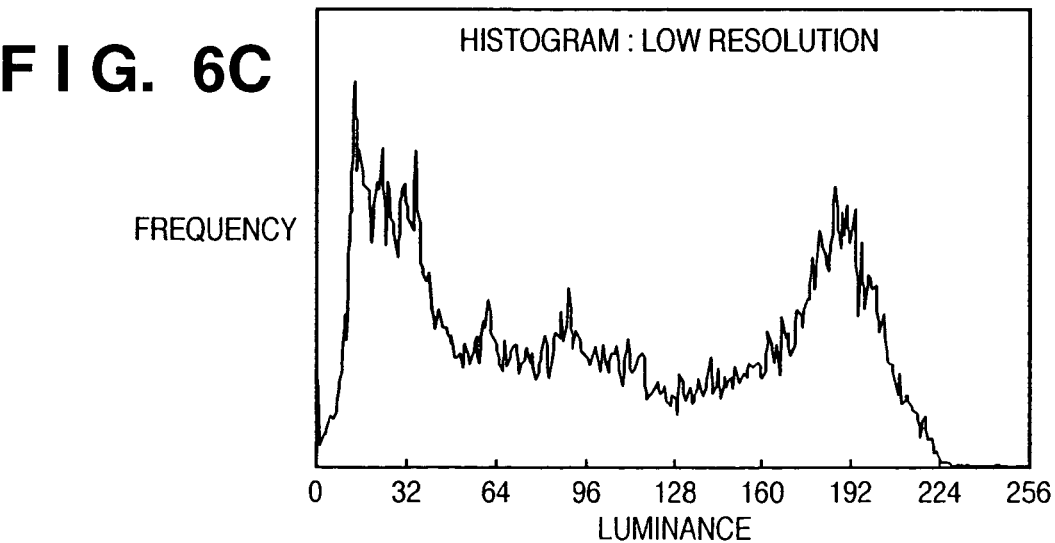

FIG. 4 is a detailed flowchart of a playback process performed by the image processing apparatus 100.

The system controller 50 reads out a recording file containing image data from the recording medium 24 to the memory 22 via the memory controller 18 (step S201), and analyzes file information concerning photographing data such as the recording mode, aperture value, shutter speed, ISO sensitivity, recording size, sensor size, and recording date/time, from the readout file (step S202).

In this file information analysis (step S202), the system controller 50 also detects the histogram marker indicating the storage location of the histogram information, the position of thumbnail image data, the position of display image data, and the position of recording image data.

If it is determined by the file information analysis (step S202) that display image data or thumbnail image data which can be played back is contained, the compression/de-compression circuit 26 performs Huffman decoding (step S203) and inverse DCT (step S204) on the display image or thumbnail image, and writes the de-compressed image data in the memory 22 via the memory controller 18 (step S205).

If the playback function with information display designated by the display switch 46 is ON (step S206), the system controller 50 determines whether the histogram information is contained in the recording file read out in step S201 (step S207).

Note that in this embodiment, during a recording operation of the image processing apparatus 100, whether to acquire a histogram from image data before irreversible compression is switched by a switch (not shown) or the like. Therefore, histogram information is not necessarily contained in the recording file read out in step S201.

If it is determined on the basis of the result of the file information analysis (step S202) that histogram information is contained (step S207), this histogram information recorded following the histogram marker is extracted (step S208).

If it is determined on the basis of the result of the file information analysis (step S202) that no histogram information is contained (step S207), the frequency distribution of the luminance or of a desired color component is acquired, via the histogram acquisition circuit 28, from the image data written in the memory 22 in step S205 (step S209).

The system controller 50 forms a graph from the extracted/acquired histogram information, and also forms display image data for information display together with the file information acquired in step S202. Then, the system controller 50 writes the display image data in the memory 22 (step S210).

The system controller 50 resizes, in the image processor 20, the image data written in step S205 to a resolution necessary for the image display 32, and displays the resized image data on the image display 32 via the memory controller 18 and D/A converter 30 (step S211).

Figure 7:
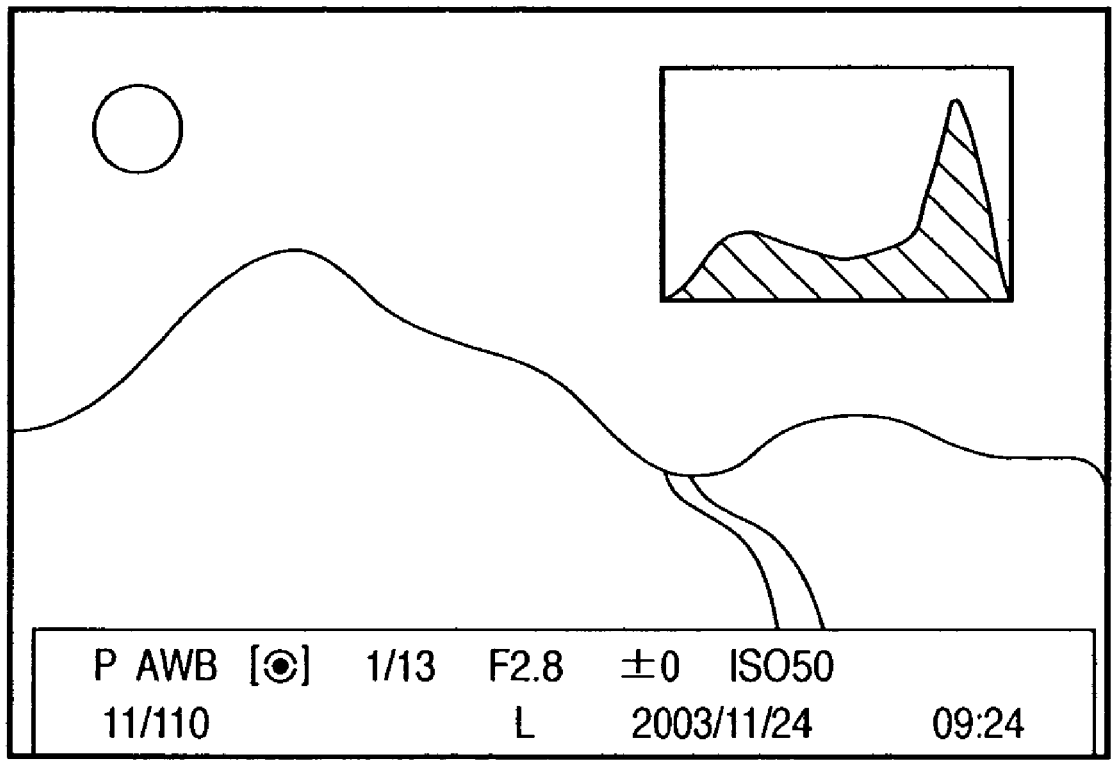
FIG. 7 is a view for explaining a display example of a histogram.

Also, if the display image data for information display is written in the memory 22 in step S210, resizing to the resolution necessary for the image display 32 is performed in the image processor 20. After that, as shown in FIG. 7, the image data for information display is superimposed on the resized image data in the memory controller 18, and displayed on the image display 32 (step S211).

The system controller 50 keeps displaying the image data displayed in step S211 on the image display 32, until playback process termination is input (step S212).

When a predetermined time has elapsed or playback process termination is input by operating the shutter switch, mode dial, or the like, the playback process is terminated.

In the first embodiment, a histogram is acquired before the resizing process in step S105 is performed. In the JPEG recording mode, however, a histogram may also be acquired from the resized image data at any timing before image information is lost by DCT. This enables the recording of a histogram matching that when a JPEG main image is recorded. Although this histogram is inferior in accuracy to the histogram acquired from the original image during image sensing, it is closer to the histogram during image sensing than a histogram formed from a highly compressed image.

In this embodiment as described above, when recorded image data is played back, histogram information during photography can be accurately and rapidly acquired and visually provided to the user.

Also, when recorded image data is played back, histogram information of the luminance or of a predetermined color during photography can be accurately and rapidly acquired and visually provided to the user.

In addition, when recorded image data is played back, even if the playback image is resized to a low resolution, histogram information during photography can be accurately acquired and visually provided to the user.

Furthermore, when recorded image data is played back, even if the playback image is irreversibly compressed at a high compression ratio, histogram information during photography can be accurately acquired and visually provided to the user.

Also, when recorded image data is played back, processing of display image data can be completed within a short time period without performing de-compression and image processing on image data having the maximum resolution, and accurate histogram information during photography can be visually provided to the user.

In the first embodiment as has been explained above, when image data which is decoded after being irreversibly compressed is displayed, a histogram close to exposure conditions perceived by the human sense during photography can be displayed.

Second Embodiment

In the second embodiment, the arrangements of an image processing apparatus and histogram acquisition circuit are apparently the same as the image processing apparatus 100 and histogram acquisition circuit 28 in the first embodiment shown in FIGS. 1 and 2. Therefore, this embodiment will also be described with reference to FIGS. 1 and 2.

This embodiment differs from the first embodiment in that instead of image data before irreversible compression, YUV data decoded from JPEG data (irreversibly compressed data) by a compression/de-compression circuit 26 is input to a histogram acquisition circuit 28 via a memory controller 18.

In this embodiment, a histogram is formed from data which is decoded after irreversibly compressed, and this histogram is corrected so as to be close to the histogram of image data before irreversible compression.

In the second embodiment, in the histogram acquisition circuit 28 shown in FIG. 2, a YUV→RGB converter 202 receives, via the memory controller 18, YUV data decoded from JPEG data by the compression/de-compression circuit 26, and converts this YUV data into RGB data in accordance with a conversion formula designated by a system controller 50.

Figure 8:
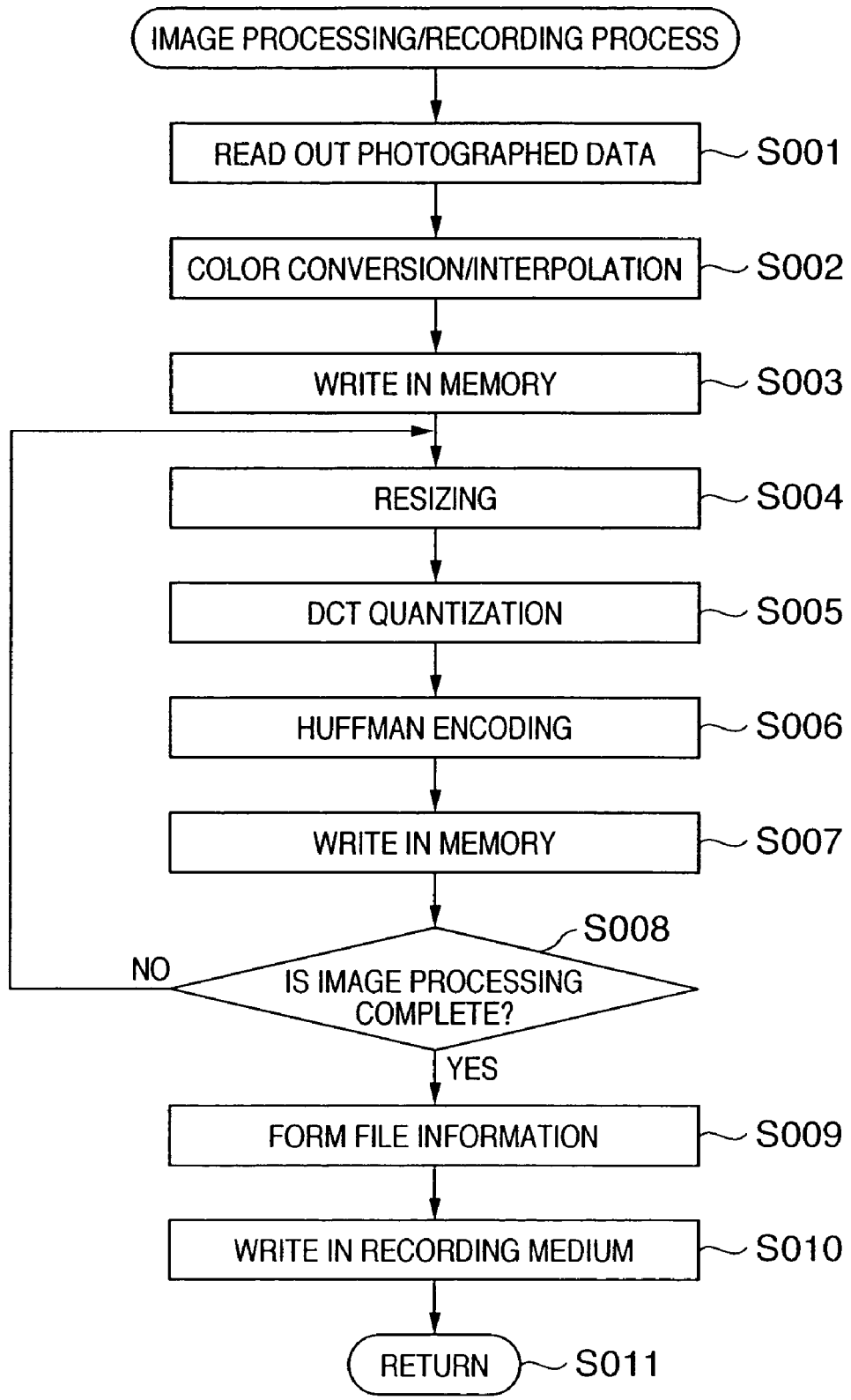
FIG. 8 is a flowchart of an image processing/recording process routine in the second embodiment.

FIG. 8 is a detailed flowchart of an image processing/recording process performed by an image processing apparatus 100 of the second embodiment.

First, digital photographing data obtained by an A/D converter 14 is once written in a memory 22 via the memory controller 18. After that, the system controller 50 reads out the photographing data from the memory 22 to an image processor 20 via the memory controller 18 (step S001), performs image processing such as color conversion/interpolation corresponding to the recording mode (step S002), and writes the processed data in the memory 22 via the memory controller 18 (step S003).

The recording modes include an RAW image recording mode and JPEG image recording mode. In the RAW image recording mode, in order to hold information in the state of image sensing as well as possible, an RAW image obtained by irreversibly compressing image sensing data which is obtained by A/D-converting an output signal from the image sensor, a JPEG main image obtained by developing this RAW image under the conditions of image sensing, and a display image and thumbnail image obtained by resizing the JPEG main image into respective predetermined resolutions are collectively recorded. In the JPEG image recording mode, a JPEG main image obtained by performing irreversible compression such as JPEG on image data which is obtained by developing image sensing data during image sensing, and a display image and thumbnail image obtained by resizing this JPEG main image into respective predetermined resolutions are collectively recorded.

The JPEG image recording mode further has a mode in which the individual resized images have different sizes (Large/Middle1/Middle2/Small), and a mode in which image qualities are different (e.g., ultrahigh image quality, high image quality, and normal). In image sensing, the user can select any one mode by using a switch (not shown). In this embodiment, data obtained by A/D-converting an output signal from the image sensor will be called image sensing data, and data which is color-separated into a luminance signal and RGB signal by developing the image sensing data, i.e., data from which histogram information is obtainable will be called image data.

A thumbnail image is low-resolution, small-sized image data which is used when a plurality of images stored in the recording medium are to be displayed in the form of a list.

A display image is image data which has a size and resolution larger and higher than those of the thumbnail image, and is prepared in a size slightly larger than that of the display unit so as to be, e.g., displayed in an enlarged scale.

The system controller 50 reads out the image data written in the memory 22 to the image processor 20 via the memory controller 18, and performs image processing such as resizing in accordance with the recording mode described above, or in accordance with the purpose, e.g., the formation of a display image or thumbnail image (step S004).

The system controller 50 supplies the image data having undergone the desired image processing to the compression/de-compression circuit 26 via the memory controller 18. The compression/de-compression circuit 26 performs discrete cosine transform (DCT) and quantization (step S005), performs Huffman encoding (step S006), and writes the compressed image data in the memory 22 (step S007).

If the system controller 50 determines that all the image processing and compression process for, e.g., the recording main image data, display image data, and thumbnail image data corresponding to the recording mode are complete (step S008), it forms file information pertaining to photographing data such as the recording mode, aperture value, shutter speed, ISO sensitivity, recording size, sensor size, and recording date/time (step S009), and writes the file information in a recording medium 24 (step S010).

When data write to the recording medium is complete, the recording process routine is terminated (step S011).

Figure 9:
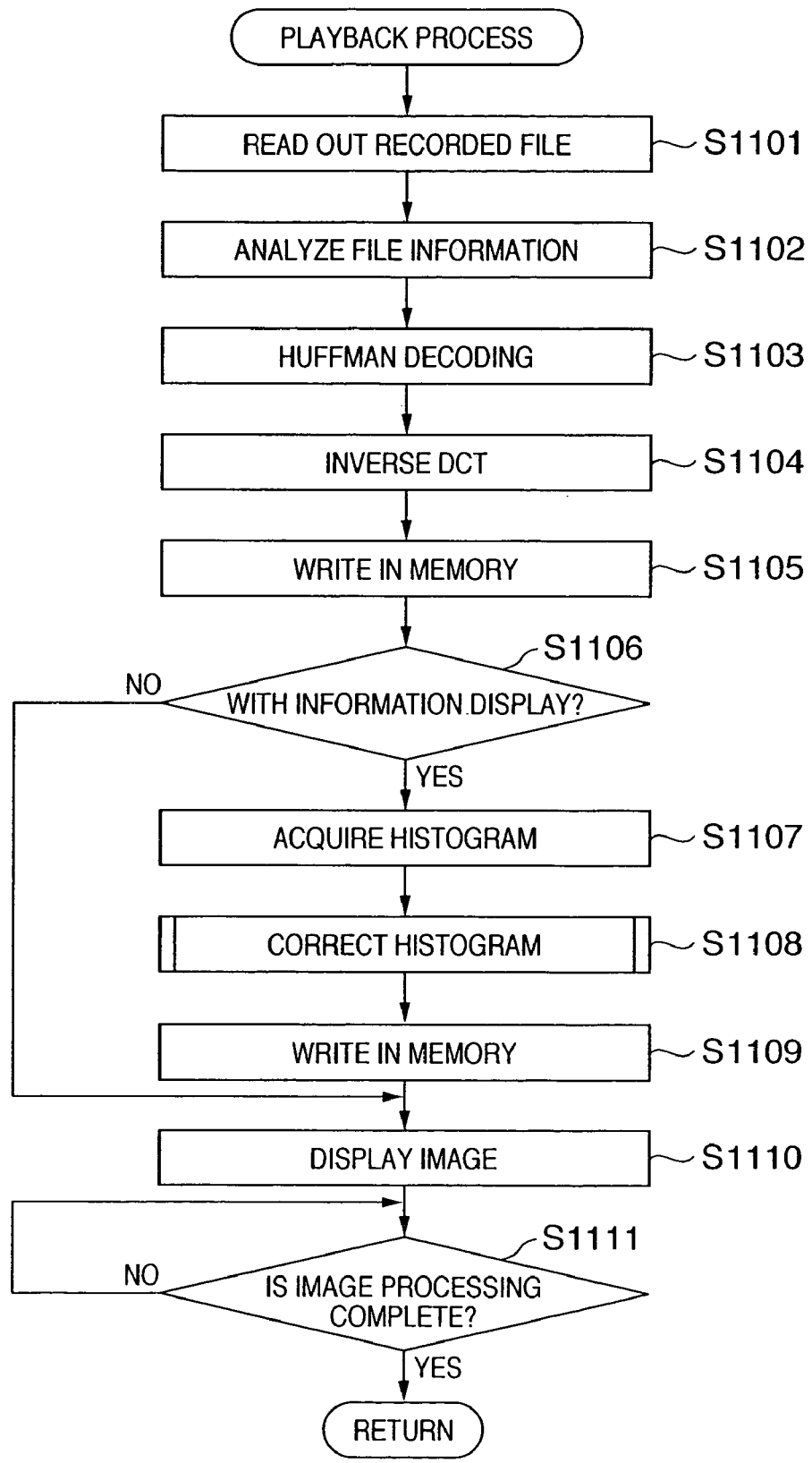
FIG. 9 is a flowchart of a playback process routine in the second embodiment.

FIG. 9 is a detailed flowchart of a playback process performed by an image processing apparatus 100 of the second embodiment.

The system controller 50 reads out, via the memory controller 18, a recording file of image sensing data written by the recording process shown in FIG. 8 from the recording medium 24 to the memory 22 (step S1101), and analyzes file information concerning photographing data such as the recording mode, aperture value, shutter speed, ISO sensitivity, recording size, sensor size, and recording date/time, from the readout file (step S1102). If it is determined by this file information analysis that the image data can be played back, the compression/de-compression circuit 26 performs Huffman decoding (step S1103) and inverse DCT (step S1104), and writes the de-compressed image data in the memory 22 via the memory controller 18 (step S1105).

If a playback function with information display designated by a display switch 46 is ON, the system controller 50 acquires, via the histogram acquisition circuit 28, the frequency distribution of the luminance or of a desired color component from the image data written in the memory 22 (step S1107).

The system controller 50 performs a desired correction process on the histogram information acquired in step S1107 (step S1108), forms a graph, and also forms display image data for information display together with the file information acquired in step S1102. Then, the system controller 50 writes the display image data in the memory 22 (step S1109). Details of the correction process (step S1108) for the histogram will be described later with reference to FIGS. 10 and 11.

The system controller 50 resizes, in the image processor 20, the image data written in step S1105 to a resolution necessary for a predetermined image display 32, and displays the resized image data on the image display 32 via the memory controller 18 and a D/A converter 30 (step S1110).

As described above, even when a thumbnail image or display image is enlarged by the user or a desired size is selected from a file (e.g., a display image and thumbnail image) having a plurality of sizes, the histogram information acquired in step S1107 or the histogram information corrected on the basis of the histogram information acquired in step S1107 is displayed. Therefore, histogram information accurately reflecting the exposure conditions during photography is displayed regardless of the size of a file.

Also, if the display image data for information display is written in the memory 22 in step S1109, resizing to the resolution necessary for the predetermined image display 32 in the image processor 20 is performed. After that, as shown in FIG. 7, the image data for displaying the file information and histogram information is superimposed on the resized image data in the memory controller 18, and displayed on the image display 32 (step S1110).

Note that the histogram is displayed on the resized image such that the image is seen through, so as not to interfere with the image data as a background. It is also possible to form an information display area and histogram display area around the resized image.

The system controller 50 keeps displaying the image data displayed in step S1110 on the image display 32, until playback process termination is input (step S1111).

When a predetermined time has elapsed or playback process termination is input by operating the shutter switch, mode dial, or the like, the playback process is terminated.

Figure 10:
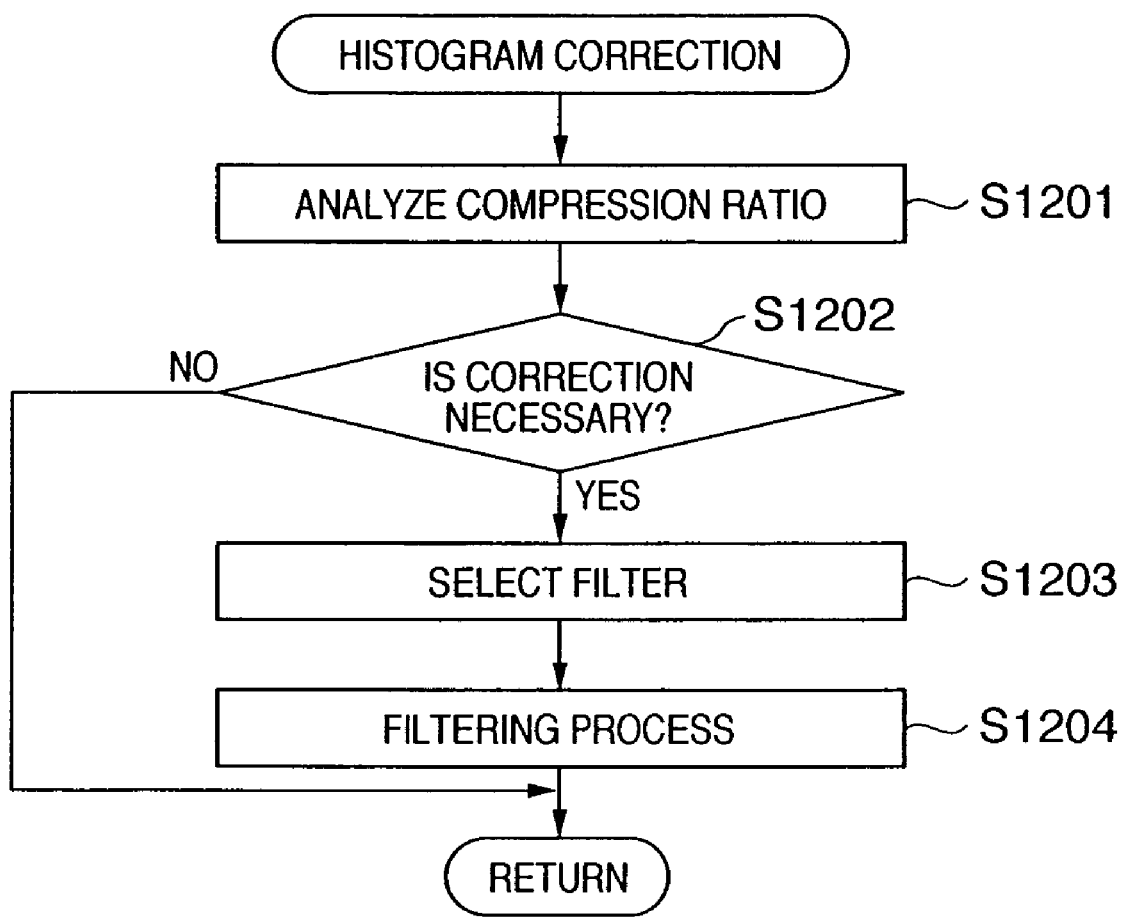
FIG. 10 is a flowchart of a histogram correction process in the second embodiment.
Figure 11:
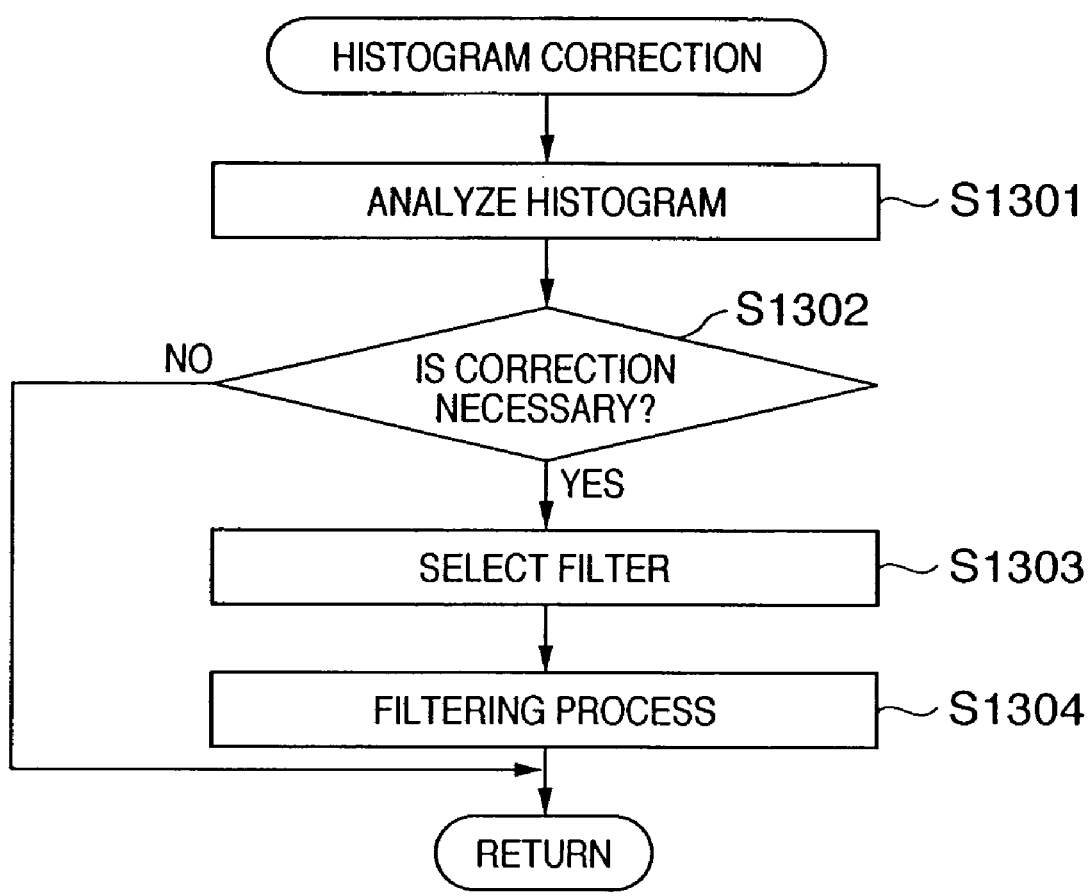
FIG. 11 is a flowchart of a histogram correction process in the third embodiment.

FIGS. 10 and 11 are detailed flowcharts of the histogram correction process (step S1108) shown in FIG. 9.

FIG. 10 is a flowchart for explaining the histogram correction process in the second embodiment of the present invention.

The system controller 50 analyzes the compression ratio by using the file information acquired in step S1102 (step S1201).

This compression ratio analysis is evaluated by the number of bits per unit pixel (to be presented below). If the compression ratio is smaller than a predetermined value (e.g., 0.5 [Bit/Pixel]), it is determined that the original histogram acquired in step S1107 requires correction (step S1202).

Compression ratio [Bit/Pixel]=file size [Bit]/(number of horizontal recording pixels×number of vertical recording lines)

If it is determined that histogram information requires correction, a filter coefficient (e.g., [14641]) corresponding to the compression ratio is selected (step S1203), and the following filtering process is performed on the histogram information (step S1204).

If the selected filter is [14641]:

$$Ha[i]=(1\times Hb[i-2]+4\times Hb[i-1]+6\times Hb[i]+4\times Hb[i+1]+1\times Hb[i+2])/16$$

Hb[i]: histogram before correction
Ha[i]: histogram after correction
where i=0 to 255

Figure 12A:
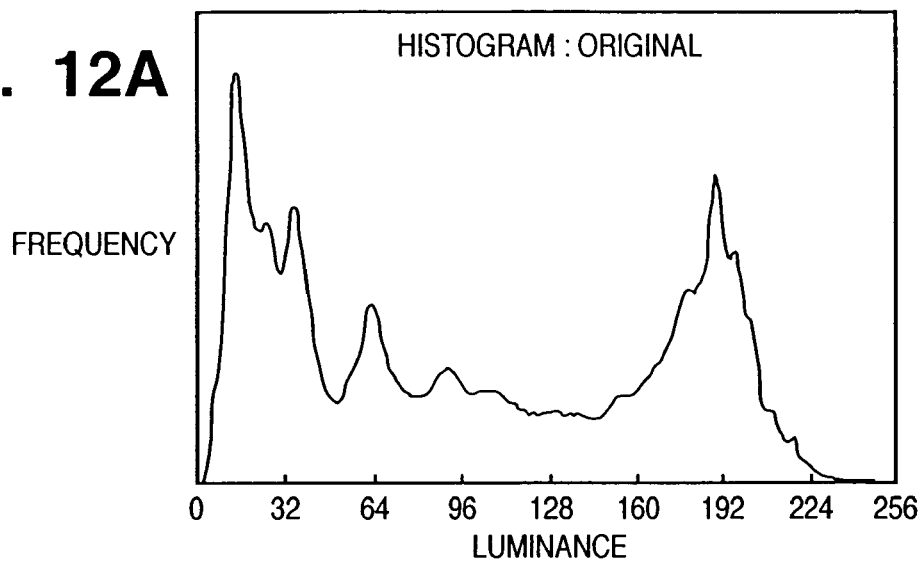
FIGS. 12A to 12C are graphs for explaining histograms.
Figure 12B:
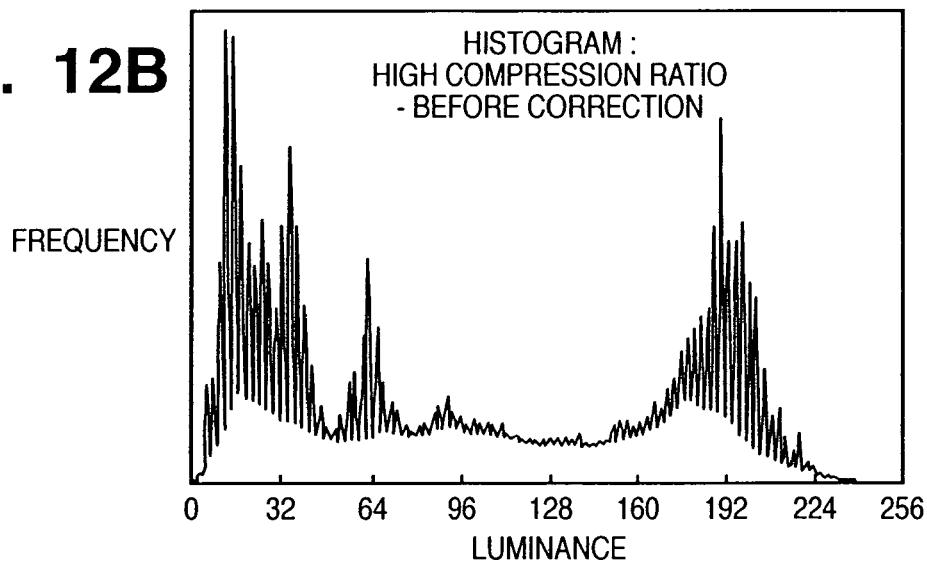
Figure 12C:
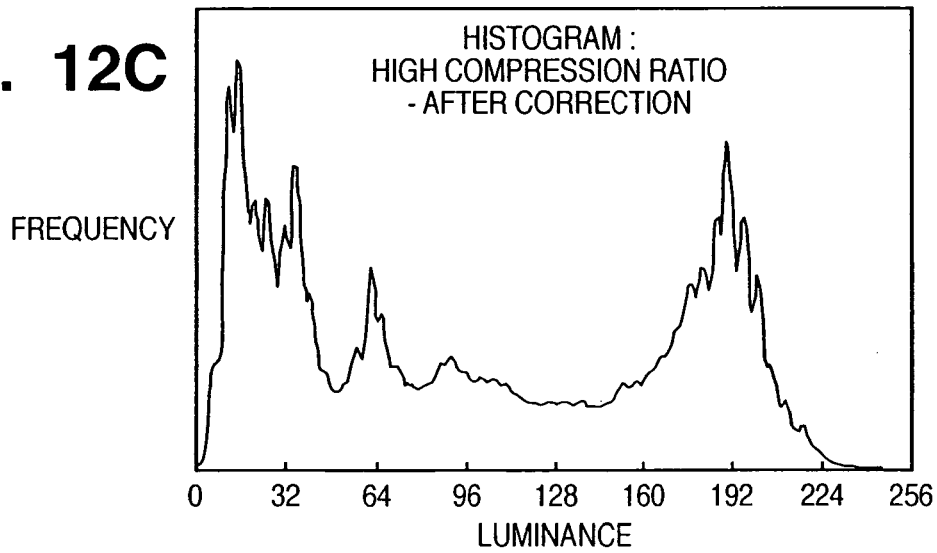

FIGS. 12A to 12C show applications of this embodiment. FIG. 12B is a graph of a histogram acquired from an image having a compression ratio of 0.35 [Bit/Pixel]. FIG. 12C is a graph of a histogram having undergone the filtering process (filter coefficient: [14641]) in step S1204. A histogram close to the original histogram is obtained by performing an appropriate filtering process.

As described above, histogram information is not acquired from the image data resized in step S1110, but a histogram corrected in accordance with the compression ratio is generated by using the original histogram acquired in step S1107.

Third Embodiment

The third embodiment differs from the second embodiment in contents of a histogram correction process. Since the rest of the processing is the same as the second embodiment, an explanation thereof will be omitted.

FIG. 11 is a flowchart for explaining the histogram correction process in the third embodiment.

First, a system controller 50 analyzes the dispersion state of histogram information acquired in step S1107 (step S1301).

This analysis of the dispersion state of the histogram is evaluated by calculating the rate of change in adjacent rate presented below from the acquired histogram.

Adjacent rate change rate [%]=$(Hb[i-1]/Hb[i]) \times 100$

Hb[i]: histogram frequency before correction where i=1 to 255

Figure 13A:
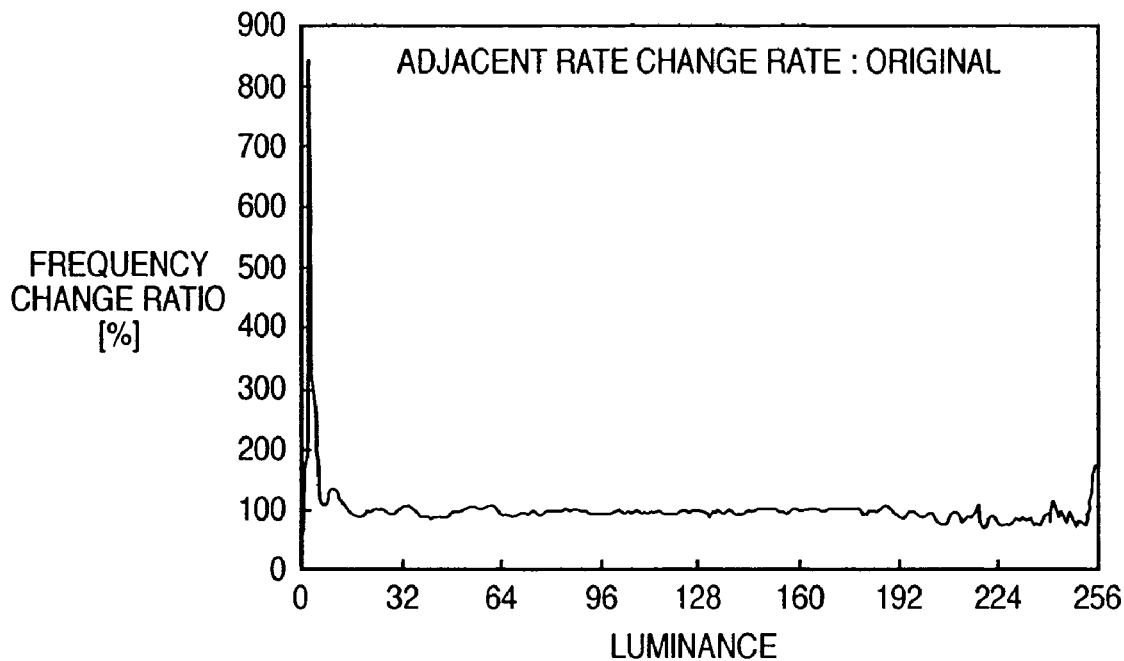
FIGS. 13A and 13B are graphs for explaining the rate of change of a histogram adjacent of luminance level.
Figure 13B:
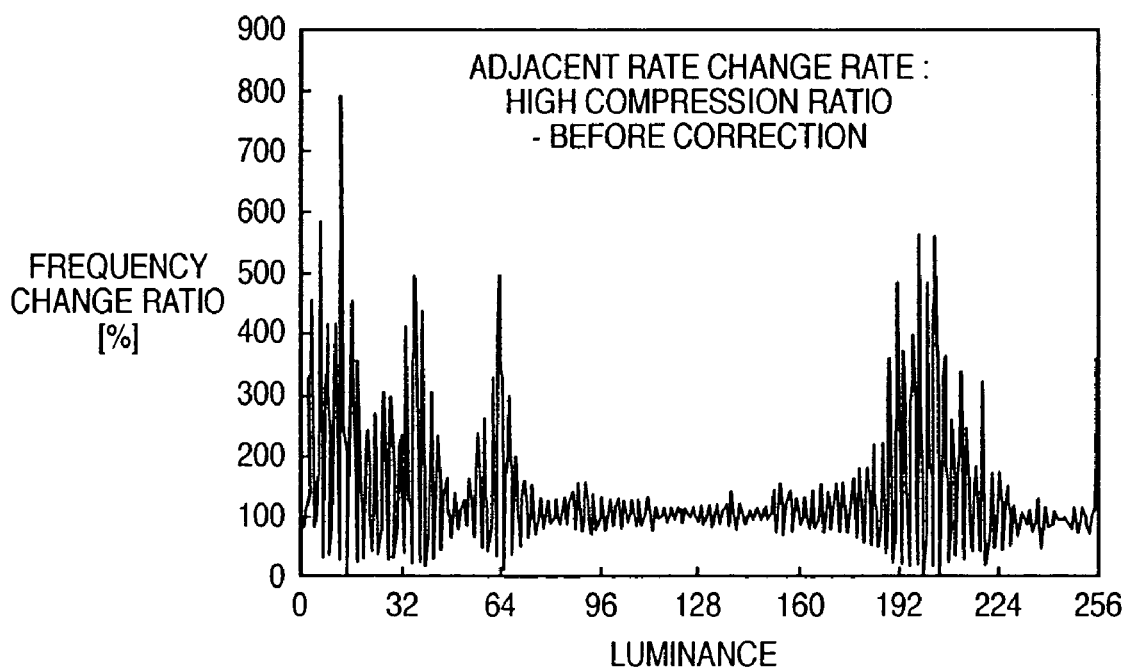

FIGS. 13A and 13B each show the rate of change of the adjacent of luminance level. That is, FIG. 13A shows the rate of change of an adjacent of luminance level calculated from the histogram shown in FIG. 12A. FIG. 13B shows the rate of change of an adjacent rate calculated from the histogram shown in FIG. 12B. When the frequency distribution moderately changes, the adjacent level normally changes near 100% as shown in FIG. 13A. On the other hand, as shown in FIG. 13B, the rate of change of an adjacent rate of a histogram acquired from an image irreversibly compressed at a high compression ratio extremely largely oscillates.

In this evaluation of the dispersion state, if a frequency at which the adjacent rate change rate exceeds a predetermined value (e.g., 200%) exceeds a predetermined number (e.g., 25 which is 10% of 256 gray levels), it is determined that the histogram acquired in step S1107 requires correction (step S1302).

If it is determined that histogram information requires correction, a filter coefficient (e.g., [14641]) corresponding to the compression ratio is selected (step S1303), and the following filtering process is performed on the histogram information (step S1304).

If the selected filter is [14641]:

$Hr[i]=(1 \times Hb[i-2]+4 \times Hb[i-1]+6 \times Hb[i]+4 \times Hb[i+1]+1 \times Hb[i+2])/16$ where i=0 to 255

FIGS. 12A to 12C show applications of this embodiment. FIG. 12C is a graph of the histogram having undergone the filtering process (filter coefficient: [14641]) in step S1304. A histogram close to the original histogram is obtained by performing an appropriate filtering process.

In the second and third embodiments of the present invention explained above, the filter coefficient is [14641]. However, it is of course also possible to obtain the same effect by another filter coefficient, depending on the compression ratio or the dispersion state of a histogram.

In addition, it is naturally also possible to estimate an assumed compression ratio from a quantization table contained in an irreversibly compressed data stream, and determine that a histogram requires correction in accordance with the result.

In this embodiment as described above, image data histogram information which is lost by irreversible compression can be visually provided to the user as histogram information close to the human sense and as histogram information close to the exposure conditions during photography, by appropriately correcting the acquired histogram information.

Also, in accordance with information contained in an irreversibly compressed data stream, necessary correction is performed on the acquired histogram information, or whether correction is necessary is determined, and an appropriate filtering process is performed on the histogram information. In this manner, histogram information close to the human sense and histogram information close to the exposure conditions during photography can be visually provided to the user.

Furthermore, in accordance with the compression ratio of irreversibly compressed image data, necessary correction is performed on the acquired histogram information, or whether correction is necessary is determined, and an appropriate filtering process is performed on the histogram information. In this manner, histogram information close to the human sense and histogram information close to the exposure conditions during photography can be visually provided to the user.

Additionally, in accordance with the dispersion state of acquired histogram information, necessary correction is performed on the acquired histogram information, or whether correction is necessary is determined, and an appropriate filtering process is performed on the histogram information. In this way, histogram information close to the human sense and histogram information close to the exposure conditions during photography can be visually provided to the user.

Also, in accordance with a quantization table contained in an irreversibly compressed data stream, necessary correction is performed on the acquired histogram information, or whether correction is necessary is determined. If it is determined that correction is necessary, an appropriate filtering process is performed on the histogram information. In this way, histogram information close to the human sense and histogram information close to the exposure conditions during photography can be visually provided to the user.

Fourth Embodiment

The fourth embodiment is a combination of the first embodiment and the second or third embodiment. The arrangements of an image processing apparatus and histogram acquisition circuit are the same as the image processing apparatus 100 and histogram acquisition circuit 28 in the first embodiment shown in FIGS. 1 and 2, so an explanation thereof will be omitted.

As in the first embodiment, during a recording operation of an image processing apparatus 100 of this embodiment, whether to acquire a histogram from image data before irreversible compression can be switched by a switch (not shown) or the like. Therefore, histogram information is not necessarily contained in the recording file read out in step S201 of the first embodiment.

In this embodiment, if in step S207 of the first embodiment it is determined on the basis of file information analysis (step S202) that histogram information is contained in the recording file read out in step S201, the flow advances to step S208 to extract the histogram information recorded following the histogram marker, and display the extracted histogram information.

On the other hand, if it is determined on the basis of the result of file information analysis (step S202) that no histogram information is contained in the recording file read out in step S201 (step S207), as in the second and third embodiments, a histogram is acquired from data which is decoded after irreversibly compressed, and this histogram is corrected by the processes shown in FIGS. 10 and 11, and displayed.

Since the operation of extracting a histogram during recording of image data can be omitted, the time during which the image data is recorded on a recording medium 24 can be reduced.

Other Embodiments

The object of the present invention can also be achieved by supplying a storage medium recording the program code of software for implementing the functions of the above embodiments to a system or apparatus, and reading out and executing the program code stored in the storage medium by a computer (or a CPU or MPU) of the system or apparatus.

In this case, the program code read out from the storage medium implements the functions of the above embodiments, and the storage medium storing this program code constitutes the invention.

As this storage medium for supplying the program code, it is possible to use, e.g., a floppy (registered trademark) disk, hard disk, optical disk, magnetooptical disk, CD-ROM, CD-R, magnetic tape, nonvolatile memory card, and ROM.

Also, besides the functions of the above embodiments are implemented by executing the readout program code by the computer, the present invention includes a case in which an OS (Operating System) or the like running on the computer performs part or the whole of actual processing in accordance with instructions from the program code and thereby implements the functions of the embodiments.

Furthermore, the present invention also includes a case in which the program code read out from the storage medium is written in a memory of a function expansion board inserted into the computer or of a function expansion unit connected to the computer, and, in accordance with instructions from the program code, a CPU or the like of the function expansion board or function expansion unit performs part or the whole of actual processing and thereby implements the functions of the above embodiments.

Note that when the present invention is applied to the storage medium described above, this storage medium stores the program code corresponding to the flowcharts explained previously.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priorities from Japanese Patent Applications No. 2004-205065 filed on Jul. 12, 2004 and No. 2004-205066 filed on Jul. 12, 2004 which are hereby incorporated by reference herein.

What is claimed is:

1. An image processing method for processing input image data from a digital camera having a histogram acquisition unit to acquire histogram information from the input image data, a resizing unit to generate resized image data by resizing the input image data to a predetermined resolution, an encoding unit to generate encoded resized image data by encoding the resized image data, and a recording unit to record the encoded resized image data and histogram information, comprising:

an inputting step of inputting the encoded resized image data;

a decoding step of decoding the encoded resized image data in said inputting step;

an acquiring step of acquiring the histogram information by analyzing the encoded resized image data input from the recording unit;

a histogram correction step of correcting the histogram information acquired by said histogram acquisition step; and a display step of displaying the resized image data decoded in said decoding step and the histogram information corrected by said histogram correction step on one screen of a display unit, wherein, when the encoded resized image data has been irreversibly compressed, said histogram correction step corrects the histogram information in accordance with a compression ratio of the encoded resized image data.

2. The method according to claim 1, wherein the input image data, before being resized in the digital camera, is RAW image data and the encoded image data is JPEG image data.

3. The method according to claim 1, wherein said acquiring step acquires one or both of a frequency distribution of luminance and a frequency distribution of a predetermined color of the encoded resized image data.

4. An image processing apparatus for processing input image data from a digital camera having a histogram acquisition unit to acquire histogram information from the input image data, a resizing unit to generate resized image data by resizing the input image data to a predetermined resolution, an encoding unit to generate encoded resized image data by encoding the resized image data, and a recording unit to record the encoded resized image data and histogram information, comprising:

an input unit that inputs the encoded resized image data;

a decoding unit that decodes the encoded resized image data input by said input unit;

an acquiring unit that acquires the histogram information by analyzing the encoded resized image data input from the recording unit;

a histogram correction unit that corrects the histogram information acquired by said acquiring unit; and a display unit that displays the resized image data decoded by said decoding unit and the histogram information corrected by said histogram correction unit on one screen, wherein, when the encoded resized image data has been irreversibly compressed, said histogram correction unit corrects the histogram information in accordance with a compression ratio of the encoded resized image data.

5. An image processing method for processing input image data from a digital camera having a histogram acquisition unit to acquire histogram information from the input image data, a resizing unit to generate resized image data by resizing the input image data to a predetermined resolution, an encoding unit to generate encoded resized image data by encoding the resized image data, and a recording unit to record the encoded resized image data and histogram information, comprising:

an inputting step of inputting the encoded resized image data;

a decoding step of decoding the encoded resized image data in said inputting step;

an acquiring step of acquiring the histogram information by analyzing the encoded resized image data input from the recording unit;

a histogram correction step of correcting the histogram information acquired by said histogram acquisition step; and a display step of displaying the resized image data decoded in said decoding step and the histogram information corrected by said histogram correction step on one screen of a display unit, wherein, when the encoded resized image data has been irreversibly compressed, said histogram correction step filters the histogram information in accordance with a compression ratio of the encoded resized image data.

6. The method according to claim 5, wherein the input image data, before being resized in the digital camera, is RAW image data and the encoded image data is JPEG image data.

7. The method according to claim 5, wherein said acquiring step acquires one or both of a frequency distribution of luminance and a frequency distribution of a predetermined color of the encoded resized image data.

8. An image processing apparatus for processing input image data from a digital camera having a histogram acquisition unit to acquire histogram information from the input image data, a resizing unit to generate resized image data by resizing the input image data to a predetermined resolution, an encoding unit to generate encoded resized image data by encoding the resized image data, and a recording unit to record the encoded resized image data and histogram information, comprising:

an input unit that inputs the encoded resized image data;

a decoding unit that decodes the encoded resized image data input by said input unit;

an acquiring unit that acquires the histogram information by analyzing the encoded resized image data input from the recording unit;

a histogram correction unit that corrects the histogram information acquired by said acquiring unit; and a display unit that displays the resized image data decoded by said decoding unit and the histogram information corrected by said histogram correction unit on one screen, wherein, when the encoded resized image data has been irreversibly compressed, said histogram correction unit filters the histogram information in accordance with a compression ratio of the encoded resized image data.

9. An image processing method for processing input image data from a digital camera having a histogram acquisition unit to acquire histogram information from the input image data, a resizing unit to generate resized image data by resizing the input image data to a predetermined resolution, an encoding unit to generate encoded resized image data by encoding the resized image data, and a recording unit to record the encoded resized image data and histogram information, comprising:

an inputting step of inputting the encoded resized image data;

a decoding step of decoding the encoded resized image data in said inputting step;

an acquiring step of acquiring the histogram information by analyzing the encoded resized image data input from the recording unit;

a histogram correction step of correcting the histogram information acquired by said histogram acquisition step; and a display step of displaying the resized image data decoded in said decoding step and the histogram information corrected by said histogram correction step on one screen of a display unit, wherein, when the encoded resized image data has been irreversibly compressed, said histogram correction step filters the histogram information in accordance with a quantization table contained in the encoded resized image data.

10. The method according to claim 9, wherein the input image data, before being resized in the digital camera, is RAW image data and the encoded image data is JPEG image data.

11. The method according to claim 9, wherein said acquiring step acquires one or both of a frequency distribution of luminance and a frequency distribution of a predetermined color of the encoded resized image data.

12. An image processing apparatus for processing input image data from a digital camera having a histogram acquisition unit to acquire histogram information from the input image data, a resizing unit to generate resized image data by resizing the input image data to a predetermined resolution, an encoding unit to generate encoded resized image data by encoding the resized image data, and a recording unit to record the encoded resized image data and histogram information, comprising:

an input unit that inputs the encoded resized image data;

a decoding unit that decodes the encoded resized image data input by said input unit;

an acquiring unit that acquires the histogram information by analyzing the encoded resized image data input from the recording unit;

a histogram correction unit that corrects the histogram information acquired by said acquiring unit; and a display unit that displays the resized image data decoded by said decoding unit and the histogram information corrected by said histogram correction unit on one screen, wherein, when the encoded resized image data has been irreversibly compressed, said histogram correction unit filters the histogram information in accordance with a quantization table contained in the encoded resized image data.

13. An image processing method for processing input image data from a digital camera having a histogram acquisition unit to acquire histogram information from the input image data, a resizing unit to generate resized image data by resizing the input image data to a predetermined resolution, an encoding unit to generate encoded resized image data by encoding the resized image data, and a recording unit to record the encoded resized image data and histogram information, comprising:

an inputting step of inputting the encoded resized image data;

a decoding step of decoding the encoded resized image data in said inputting step;

an acquiring step of acquiring the histogram information by analyzing the encoded resized image data input from the recording unit;

a histogram correction step of correcting the histogram information acquired by said histogram acquisition step; and a display step of displaying the resized image data decoded in said decoding step and the histogram information corrected by said histogram correction step on one screen of a display unit, wherein, when the encoded resized image data has been irreversibly compressed, the histogram correction step includes performing a histogram correction process selected based on a compression ratio of the encoded resized image data.

14. The method according to claim 13, wherein the input image data, before being resized in the digital camera, is RAW image data and the encoded image data is JPEG image data.

15. The method according to claim 13, wherein said acquiring step acquires one or both of a frequency distribution of luminance and a frequency distribution of a predetermined color of the encoded resized image data.

16. An image processing apparatus for processing input image data from a digital camera having a histogram acquisition unit to acquire histogram information from the input image data, a resizing unit to generate resized image data by resizing the input image data to a predetermined resolution, an encoding unit to generate encoded resized image data by encoding the resized image data, and a recording unit to record the encoded resized image data and histogram information, comprising:
- an input unit that inputs the encoded resized image data;
- a decoding unit that decodes the encoded resized image data input by said input unit;
- an acquiring unit that acquires the histogram information by analyzing the encoded resized image data input from the recording unit;
- a histogram correction unit corrects the histogram information acquired by said acquiring unit; and
- a display unit that displays the resized image data decoded by said decoding unit and the histogram information corrected by said histogram correction unit on one screen,
- wherein, when the encoded resized image data has been irreversibly compressed, the histogram correction unit performs a histogram correction process selected based on a compression ratio of encoded resized image data.

17. An image processing method for processing input image data from a digital camera having a histogram acquisition unit to acquire histogram information from the input image data, a resizing unit to generate resized image data by resizing the input image data to a predetermined resolution, an encoding unit to generate encoded resized image data by encoding the resized image data, and a recording unit to record the encoded resized image data and histogram information, comprising:
- an inputting step of inputting the encoded resized image data;
- a decoding step of decoding the encoded resized image data in said inputting step;
- an acquiring step of acquiring the histogram information by analyzing the encoded resized image data input from the recording unit;
- a histogram correction step of correcting the histogram information acquired by said histogram acquisition step; and
- a display step of displaying the resized image data decoded in said decoding step and the histogram information corrected by said histogram correction step on one screen of a display unit,
- wherein, when the encoded resized image data has been irreversibly compressed, the histogram correction step includes performing a histogram correction process selected based on a quantization table contained in the encoded resized image data.

18. The method according to claim 17, wherein the input image data, before being resized in the digital camera, is RAW image data and the encoded image data is JPEG image data.

19. The method according to claim 17, wherein said acquiring step acquires one or both of a frequency distribution of luminance and a frequency distribution of a predetermined color of the encoded resized image data.

20. An image processing apparatus for processing input image data from a digital camera having a histogram acquisition unit to acquire histogram information from the input image data, a resizing unit to generate resized image data by resizing the input image data to a predetermined resolution, an encoding unit to generate encoded resized image data by encoding the resized image data, and a recording unit to record the encoded resized image data and histogram information, comprising:
- an input unit that inputs the encoded resized image data;
- a decoding unit that decodes the encoded resized image data input by said input unit;
- an acquiring unit that acquires the histogram information by analyzing the encoded resized image data input from the recording unit;
- a histogram correction unit that corrects the histogram information acquired by said acquiring unit; and
- a display unit that displays the resized image data decoded by said decoding unit and the histogram information corrected by said histogram correction unit on one screen,
- wherein, when the encoded resized image data has been irreversibly compressed, the histogram correction unit performs a histogram correction process selected based on a quantization table contained in the encoded resized image data.

* * * * *